(12) United States Patent
Schäfer et al.

(10) Patent No.: US 6,623,073 B2
(45) Date of Patent: Sep. 23, 2003

(54) HEAD RESTRAINT FOR A VEHICLE SEAT

(75) Inventors: Volker Schäfer, Otterbach (DE); Andreas Berberich, Landstuhl (DE); Thomas Jung, Aschbach (DE); Olaf Kreuels, Zweibrücken (DE); Dieter Braun, Otterberg (DE)

(73) Assignee: Keiper GmbH & Co. KG, Kaiserslautern (DE)

( * ) Notice: Subject to any disclaimer, the term of this patent is extended or adjusted under 35 U.S.C. 154(b) by 0 days.

(21) Appl. No.: 10/288,971

(22) Filed: Nov. 6, 2002

(65) Prior Publication Data

US 2003/0057748 A1 Mar. 27, 2003

Related U.S. Application Data

(63) Continuation of application No. PCT/EP02/01034, filed on Feb. 1, 2002.

(30) Foreign Application Priority Data

May 18, 2001 (DE) .......................................... 101 24 662
Feb. 24, 2001 (DE) .......................................... 101 09 160

(51) Int. Cl.[7] .............................................. B60R 22/28
(52) U.S. Cl. .................................................. 297/216.12
(58) Field of Search ........................... 297/391, 216.12, 297/406, 407

(56) References Cited

U.S. PATENT DOCUMENTS

| | | |
|---|---|---|
| 3,586,366 A | 6/1971 | Patrick |
| 3,838,870 A | 10/1974 | Hug |
| 4,511,180 A | 4/1985 | Klaus |
| 4,668,014 A | 5/1987 | Boisset |
| 5,290,091 A | 3/1994 | Dellanno et al. |
| 5,738,412 A | 4/1998 | Aufrere et al. |
| 5,820,211 A | 10/1998 | Heilig et al. |
| 5,934,750 A | 8/1999 | Föhl |
| 6,082,817 A | 7/2000 | Müller |
| 6,088,640 A | 7/2000 | Breed |
| 6,199,947 B1 * | 3/2001 | Wiklund ................ 297/216.12 |
| 6,213,548 B1 | 4/2001 | Van Wynsberghe et al. |
| 2001/0040396 A1 | 11/2001 | Kreuels et al. |

FOREIGN PATENT DOCUMENTS

| | | |
|---|---|---|
| DE | 35 19 058 A1 | 12/1986 |
| DE | 39 00 495 A1 | 7/1990 |
| DE | 296 03 467 U1 | 8/1996 |
| DE | 296 14 238 U1 | 1/1997 |
| DE | 197 57 533 A1 | 10/1998 |
| DE | 197 31 059 A1 | 1/1999 |
| DE | 299 07 245 U1 | 9/1999 |
| DE | 199 23 909 A1 | 1/2000 |
| DE | 199 10 666 A1 | 9/2000 |
| DE | 199 51 966 A1 | 5/2001 |
| DE | 100 04 766 A1 | 8/2001 |
| EP | 0 974 484 A2 | 1/2000 |
| EP | 1 193 114 A1 | 4/2002 |
| FR | 2 802 484 A1 | 6/2001 |
| JP | 10-278648 | 10/1998 |
| JP | 11321502 | 11/1999 |
| JP | A-2000-335301 | 12/2000 |
| WO | WO 98/24652 A1 | 6/1998 |

\* cited by examiner

*Primary Examiner*—Peter R. Brown
(74) *Attorney, Agent, or Firm*—Alston & Bird LLP

(57) ABSTRACT

A headrest (1) for a vehicle seat, in particular for a motor vehicle seat, has a first assembly for contact with the occupant's head and a height-adjustable second assembly (25, 41). The first assembly (101) moves forward relative to the second assembly (25, 41) in the event of a crash. A third assembly (15) on the headrest (1) is provided beneath the second assembly (25, 41). The first assembly (101) moves upward relative to the third assembly (15) in the event of a crash.

18 Claims, 7 Drawing Sheets

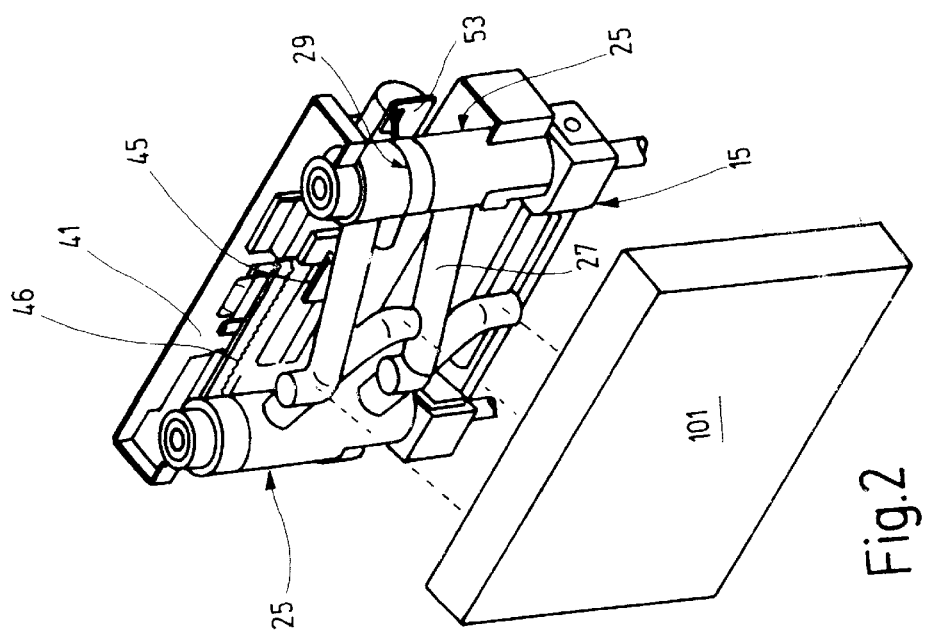
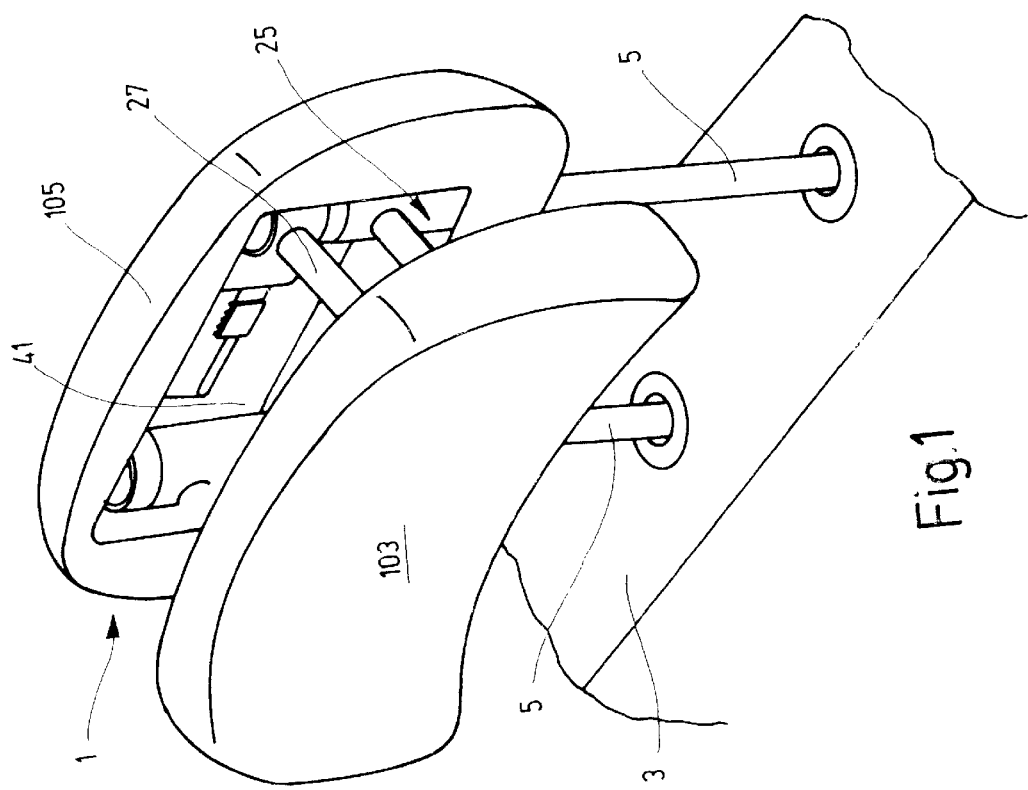

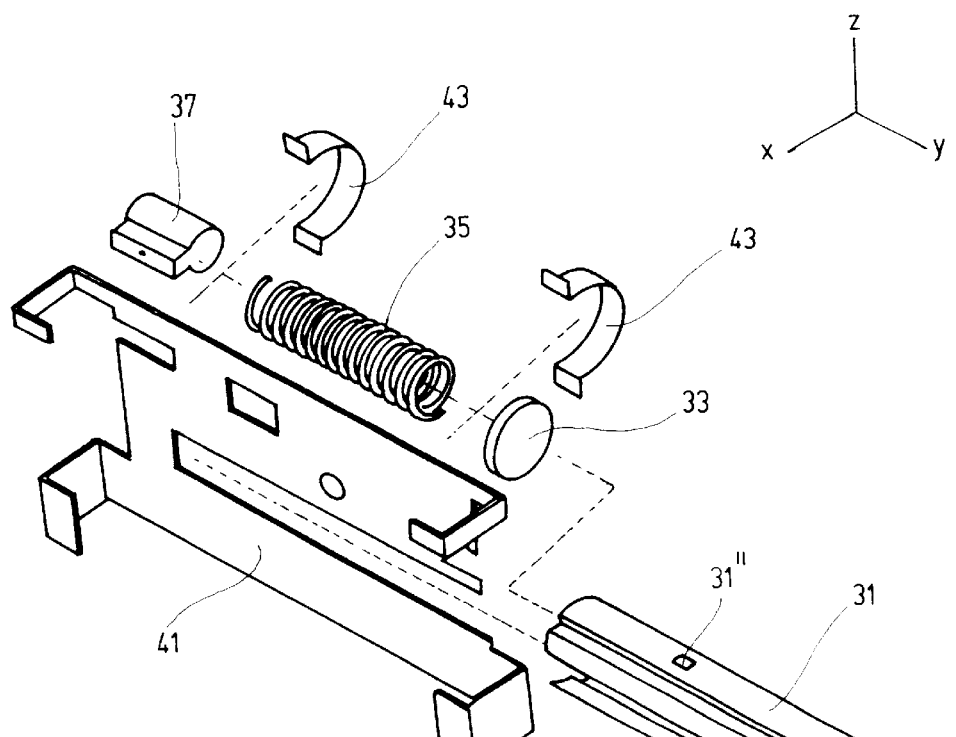
Fig.4
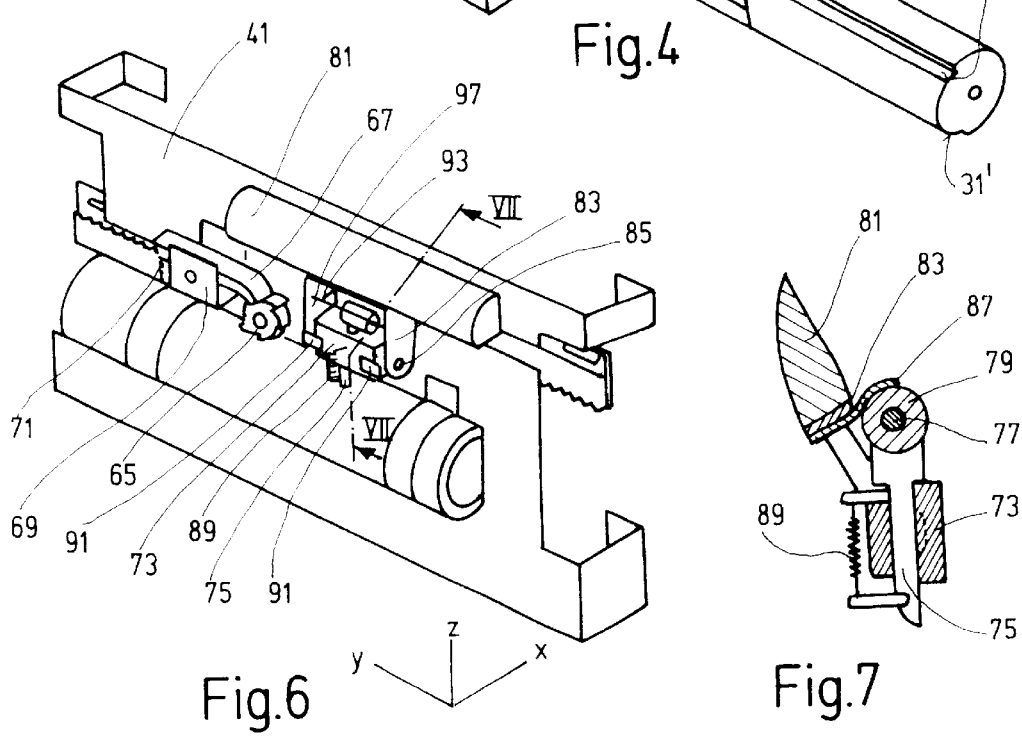
Fig.6
Fig.7

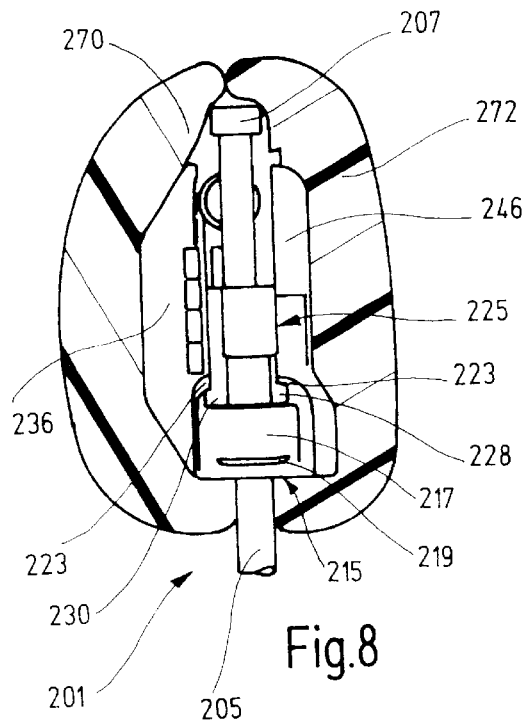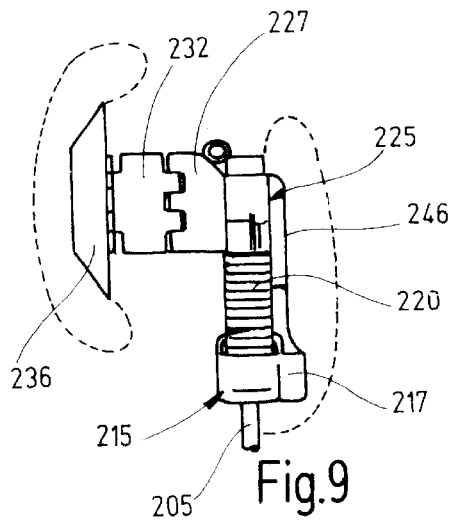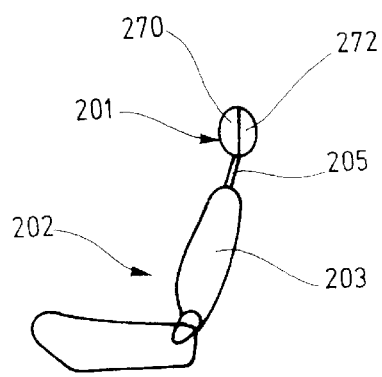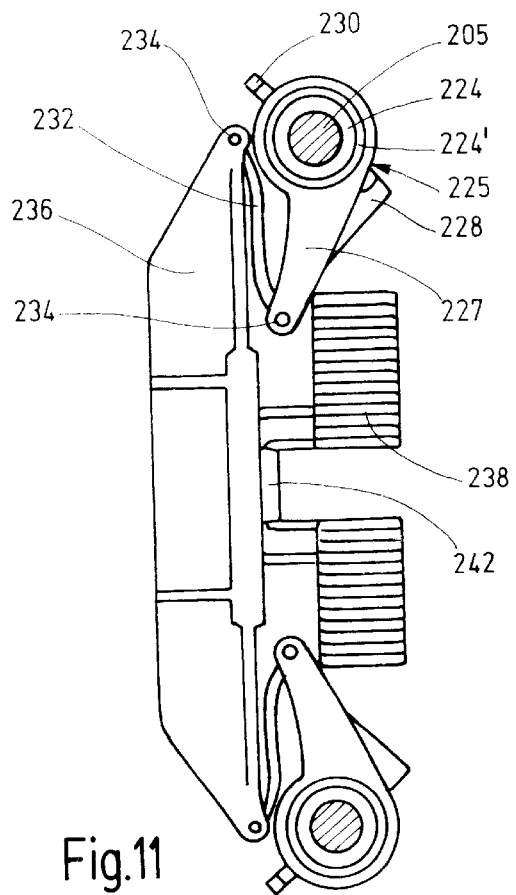

HEAD RESTRAINT FOR A VEHICLE SEAT

CROSS-REFERENCE TO RELATED APPLICATION

This application is a continuation of PCT/EP02/01034, which is entirely incorporated herein by reference, was filed Feb. 1, 2002, designates the U.S., and was published in German on Sep. 6, 2002.

BACKGROUND OF THE INVENTION

The present invention relates to a head restraint for a vehicle seat, in particular for a motor vehicle seat, having a first subassembly for resting against the head of the occupant, and a vertically adjustable, second subassembly, with the first subassembly moving forward relative to the second subassembly in the event of a crash.

A head restraint of this type is disclosed in DE 39 00 495 A1. In the event of a crash, the distance between the head of the occupant and the head restraint is reduced in order to avoid whiplash (cervical vertebrae syndrome).

BRIEF SUMMARY OF THE INVENTION

One aspect of the present invention is the provision of an improved head restraint. In accordance with one aspect of the present invention, a head restraint for a vehicle seat, in particular for a motor vehicle seat, includes a first subassembly for resting against the head of the occupant, and a vertically adjustable, second subassembly, with the first subassembly moving forward relative to the second subassembly in the event of a crash. Further in accordance with this aspect, a third subassembly of the head restraint is arranged below the second subassembly, and the first subassembly moves upward relative to the third subassembly in the event of a crash.

By virtue of a third subassembly of the head restraint, which subassembly is arranged below the second subassembly, being provided relative to which the first subassembly moves upward in the event of a crash, an initial erroneous positioning of the head restraint level with the neck can be corrected, so that the padding of the head restraint comes as close as possible to the back of the occupant's head. This protects the occupant even better from injury, in particular from "cervical vertebrae syndrome" and from breaking the neck. The extent of the movement upward depends on the height set for the head restraint.

The present invention, with which the crash characteristics of the head restraint are improved, can be used in all types of vehicle seats, for example in front seats or rear seat benches of motor vehicles, or in aircraft seats. The head restraint is preferably designed for a rear-end crash, but may also be correspondingly designed for the event of a head-on crash. The head restraint may be part of an automatic head restraint adaptation system, i.e. the height of the head restraint is set automatically via the longitudinal setting of the vehicle seat. In the rearmost position of the vehicle seat, the head restraint takes up its highest position, and in the front-most position its lowest position. The height of the head restraint can optionally be readjusted by a manual height-setting means.

For drives (e.g. driving mechanisms for respectively moving the first subassembly forward relative to the second subassembly and upward relative to the third subassembly in the event of a crash) which are to be constructed in as simple a manner as possible, it is preferable for the first subassembly to be moveable relative to the second subassembly (forwards) and for the second subassembly to be moveable relative to the third subassembly (upwards). The movements may be purely translatory, combinations of a translatory and a pivoting movement, or combinations of two pivoting movements. In the latter case, translatory movement can be produced again, for example by means of sliding guides. Lever arms, with which relatively large paths can Then be covered, are advantageous for pivoting movements of this type. The different movements can be controlled better by using separate energy stores, trains of mechanisms and guides, and by using common release mechanisms. For impacts against the head restraint taking place outside the event of a crash, a safety catch is preferably provided for preventing unintended activation of the crash-active head restraint.

Within the context of a modular construction and for better interchangeability and for short actuating distances and a great saving on structural space, it is advantageous if all of the subassemblies, including crash-sensitive sensors, energy stores, trains of mechanisms and other driving elements, are integrated within the head restraint, i.e. form a closed unit in the initial state.

Internal supports enable the extended head restraint to be secured before being retracted as a consequence of the occupant's head striking against it, and translatory extension movements of the head restraint provide more possibilities in this case. The securing of the released state by a special catch of this type has the advantage that the occupant's head cannot transmit any energy reversibly into the head restraint, which might cause his head to be re-accelerated.

As a catch of this type, a freewheel is preferably provided which blocks a pivoting device moving at the same time, with the result that the latter is used as a support. A freewheel of this type may also be provided in the case of a vehicle seat, in whose backrest an upper part of the backrest, which part is provided with a head restraint, pivots forward, in the event of a crash, from an initial state, relative to a lower part of the backrest, the freewheel then blocking a pivoting movement of the upper part to the rear. If arranged in the head restraint, the freewheel may be effective, for example, between the pivoting device and a head restraint rod and may be released again preferably at a certain height on the head restraint rod, for example in a section of smaller diameter.

BRIEF DESCRIPTION OF THE DRAWINGS

The invention is explained in greater detail below with reference to two exemplary embodiments which are illustrated in the drawings, in which:

FIG. 1 shows a perspective view of the first exemplary embodiment obliquely from the front in the released state, FIG. 2 shows an illustration corresponding to FIG. 1 without padding in the initial state before installation of the impact plate, FIG. 4 shows an exploded illustration of the components of the energy store for the pivoting movement in a perspective view obliquely from the front, FIG. 6 shows a perspective view counter to FIG. 2 obliquely from the rear in the initial state, FIG. 7 shows a section along the line VII—VII in FIG. 6 in the released state, FIG. 8 shows a left side view, illustrated partially cut away, of the second exemplary embodiment in the initial state, FIG. 9 shows a section through the second exemplary embodiment in the event of a crash, FIG. 10 shows a schematic view of a vehicle seat, FIG. 11 shows a plan view, illustrated partially cut away, of the second exemplary embodiment in the initial state.

DETAILED DESCRIPTION OF THE INVENTION

Figure 3:
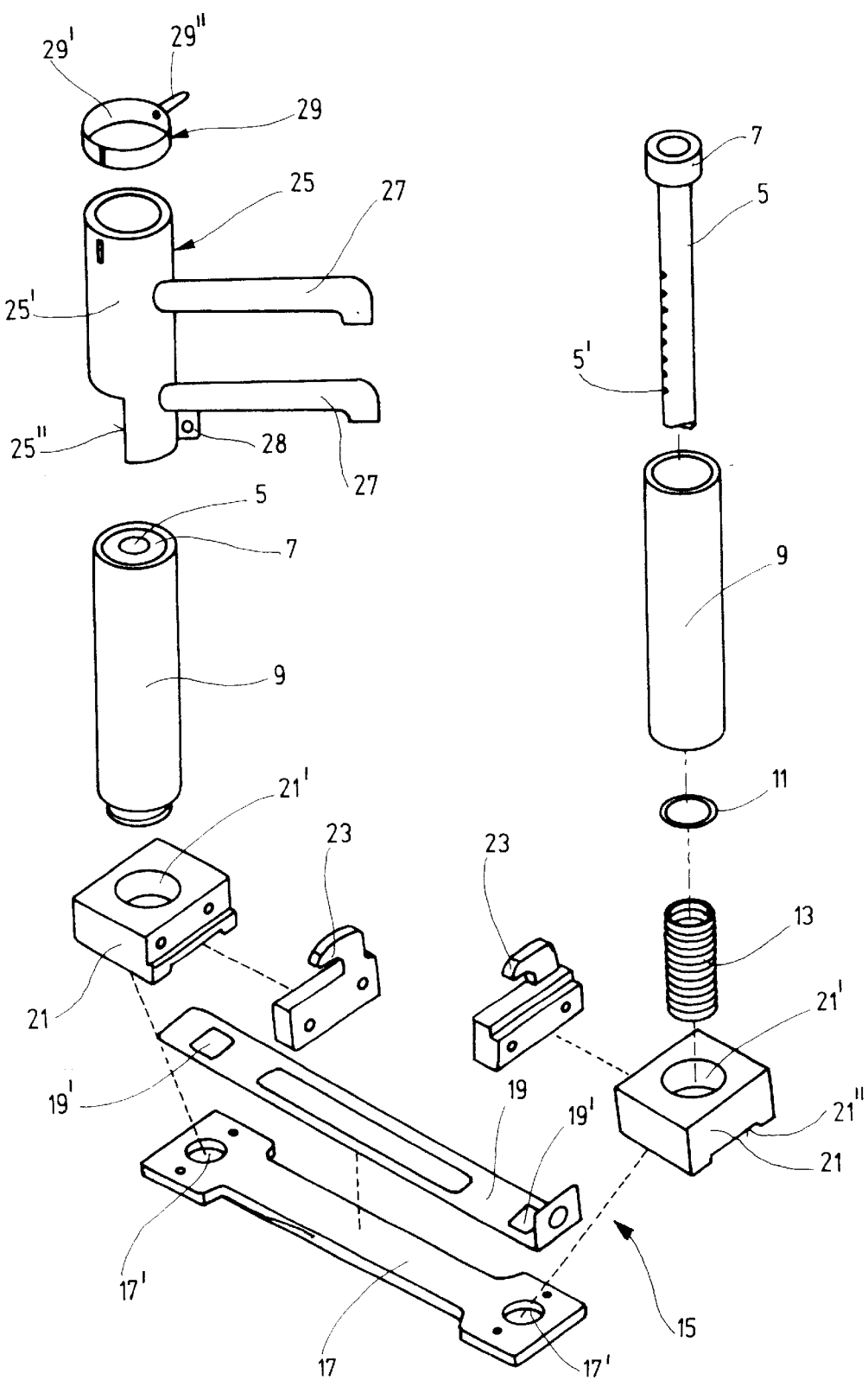
FIG. 3 shows an exploded illustration of the components of the vertical-locking means in a perspective view obliquely from the front.
Figure 5:
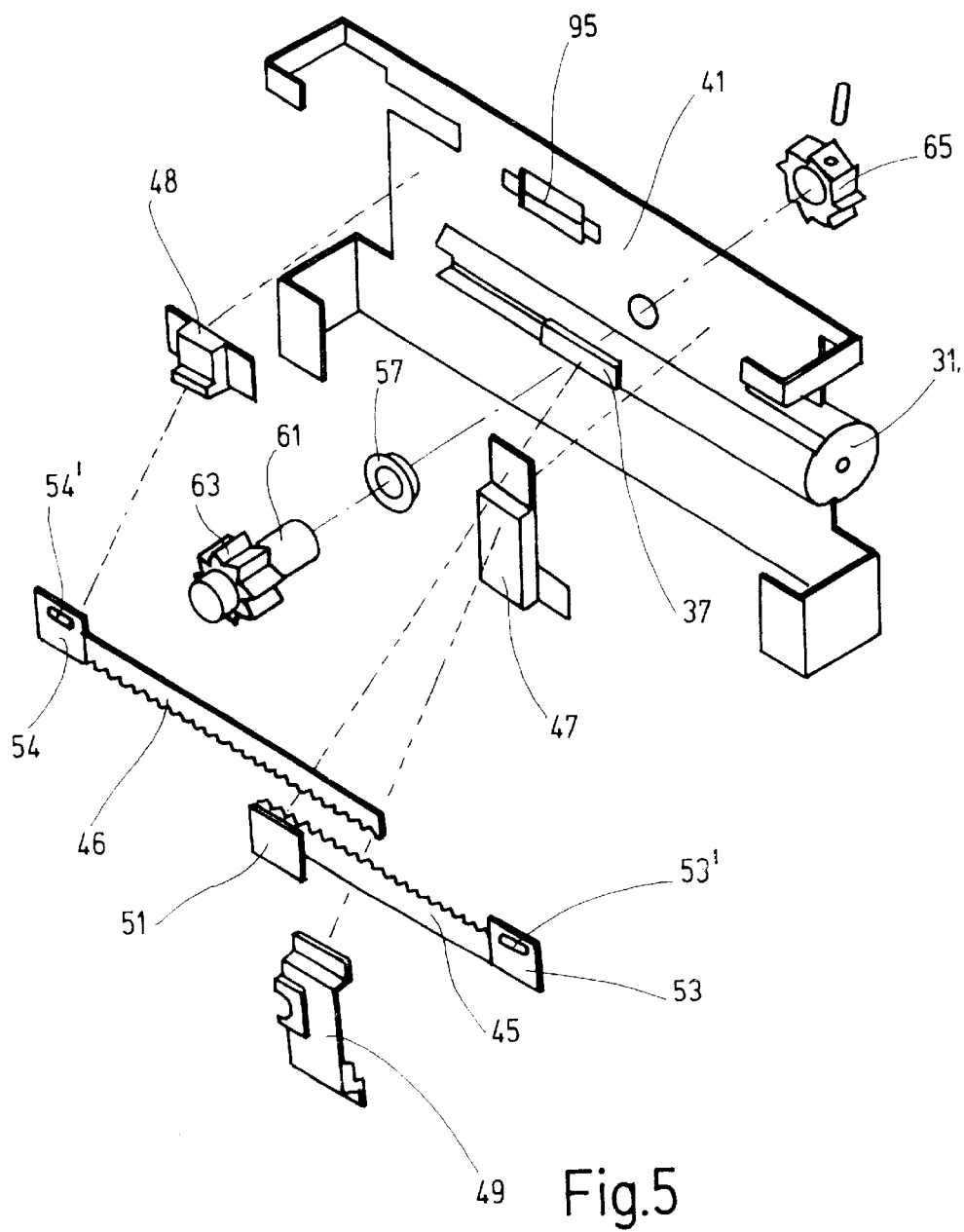
FIG. 5 shows an exploded illustration of the components of the train of mechanisms for the pivoting movement in a perspective view obliquely from the front.
Figure 12A:
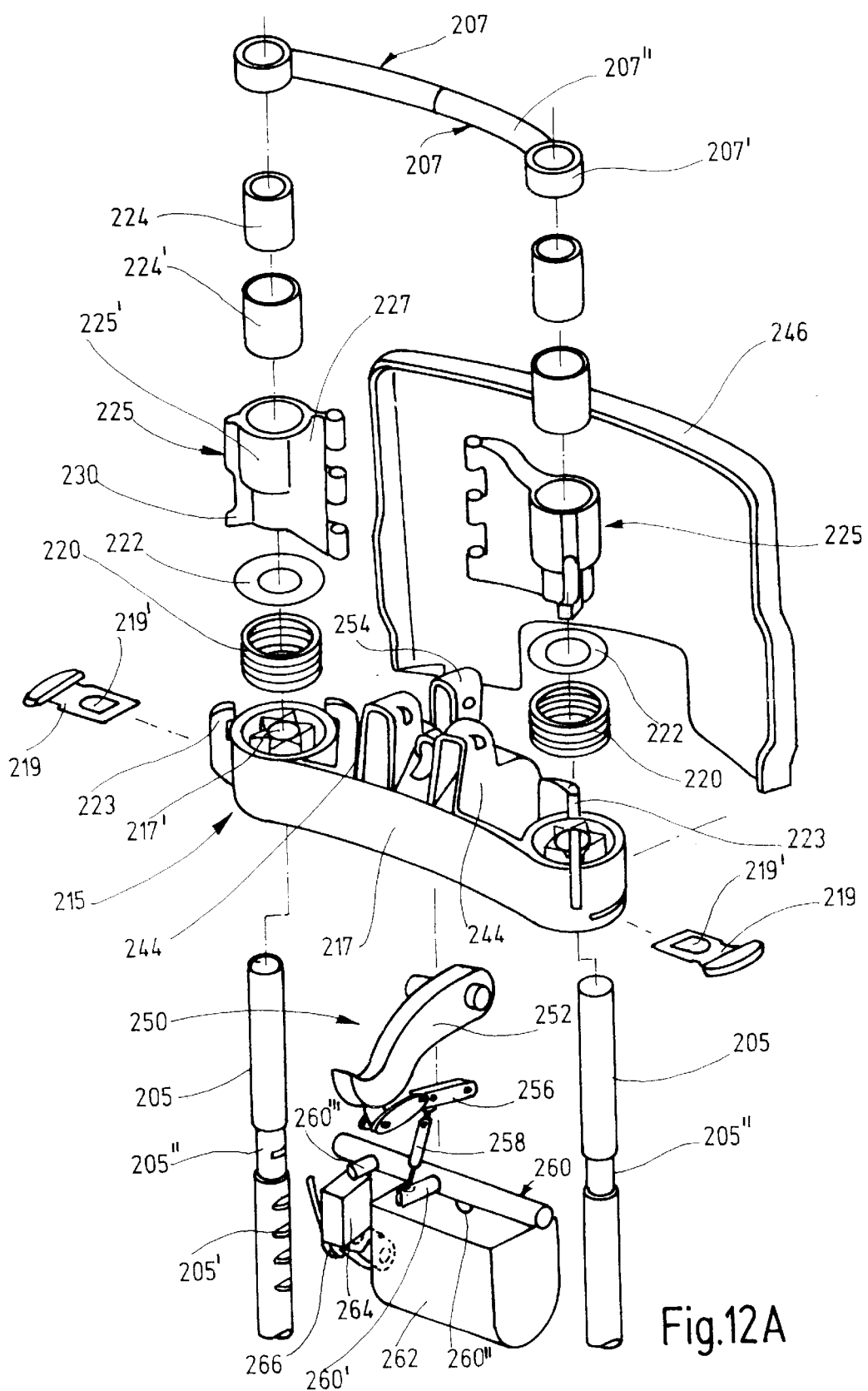
FIG. 12A shows an exploded illustration of the components of the second and third sub assemblies of the second exemplary embodiment with a viewing direction from the left at the front.
Figure 12B:
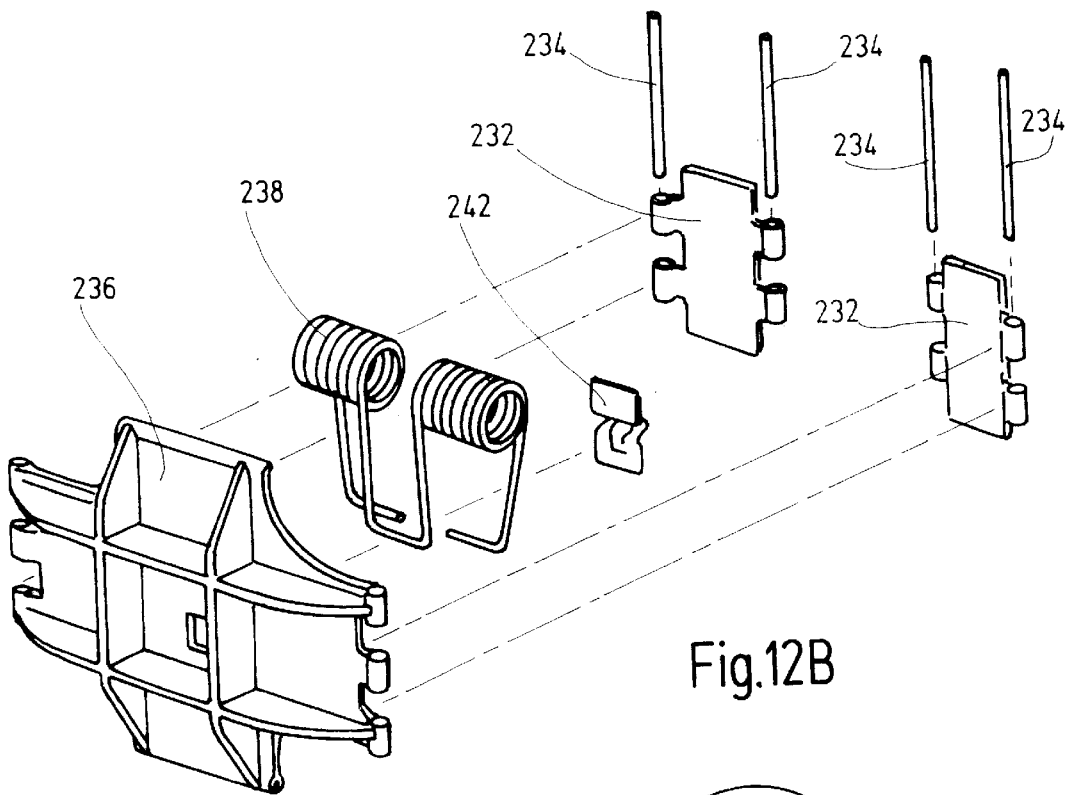
FIG. 12B shows an exploded illustration of the components of the first subassembly and of the connection to the second subassembly with a viewing direction from the left at the front.
Figure 13:
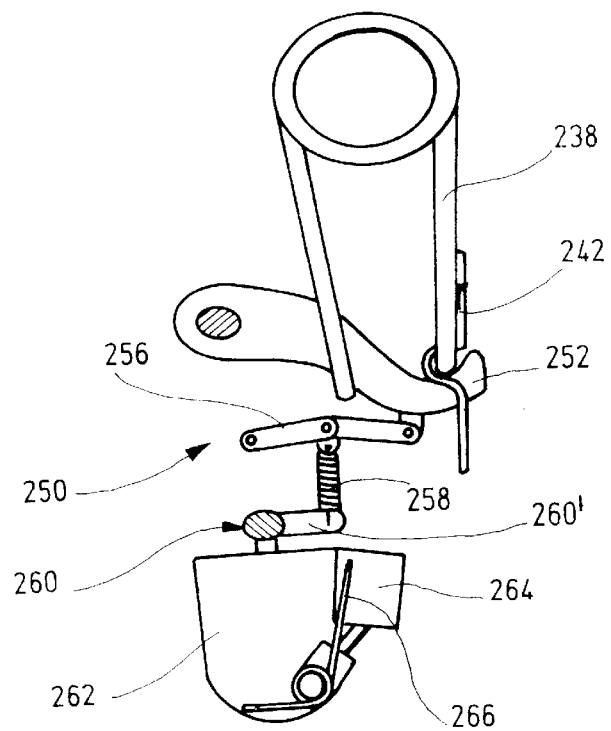
FIG. 13 shows a partial view of the second exemplary embodiment in the region of the impact-body locking means with a viewing direction from the right.

In the first exemplary embodiment, a head restraint 1 for a vehicle seat is attached onto two head restraint rods 5 introduced into the backrest 3. The following directional details refer to the arrangement of the vehicle seat in a motor vehicle and to the usual direction of travel thereof (x direction). In order to be set vertically, the head restraint 1 is designed in a manner known per se such that it can be displaced vertically (z direction) relative to the backrest 3 and can be snapped into place by suitable snap-in means. In the following, first of all the initial state or the operative state of the head restraint 1 is described.

An annular stop sleeve 7 is, for example, pinned to the upper end of each head restraint rod 5, or is designed as a single piece therewith. For each head restraint rod 5, there is provided within the head restraint 1 a hollow cylindrical guide sleeve 9 into which a washer 11 and a compression spring, referred to in the following as a vertical compression spring 13, are inserted from below, and the head restraint rod 5 is inserted from above. The two guide sleeves 9 are fitted on a vertical-locking means 15. The vertical-locking means 15, which is arranged in the transverse direction of the vehicle seat (y direction), comprises an elongate lower part 17 having two passages 17' for the head restraint rods 5, an elongate slide 19 which is arranged on the lower part 17 along the latter and has two slightly oblong passages 19' for the head restraint rods 5, and two block-like upper parts 21 which are screwed onto the two ends of the lower part 17, provided in each case with a respective, forwardly pointing locking hook 23 on the mutually facing sides, and have holes 21' for the passage of the head restraint rods 5. The upper parts 21 and the locking hooks 23 may be designed separately or as a single piece, it also being possible for the lower part 17 to be designed as a single piece with the upper parts 21.

The upper parts 21 are spaced apart from the lower part 17, by means of grooves 21" in the region of their holes 21', to such an extent that, within these grooves 21", the slide 19 can be displaced in its longitudinal direction within the scope of the dimensions of its passages 19' for the head restraint rods 5. The slide 19 can interact, via the boundaries of its passages 19', with corresponding notches 5' in the head restraint rods 5, in order to lock the latter. During installation, the guide sleeves 9 are introduced together with the head restraint rods 5 into the vertical-locking means 15 to such an extent that the slide 19, which is pulled somewhat to the left in the y direction, snaps into the lowermost notch 5'. In normal use, the snap-in position of the slide changes and, as a result, the height of the head restraint 1 is set.

A respective pivoting device 25 with its tubular pivoting sleeve 25' for a pivotable mounting is pushed onto each guide sleeve 9. Protruding radially from the pivoting sleeve 25' are two pivoting arms 27 which are welded on or designed as a single piece therewith. At the lower end of its pivoting sleeve 25', each pivoting device 25 has a passage-like locking socket 28 which points inwards in the initial state of the head restraint 1 and is pivoted over the locking hook 23, so that the pivoting device 25 is locked. In this initial state, the pivoting arms 27, which are slightly offset with respect to each other, of the two pivoting devices 25 face each other crossed over in the manner of folded hands. At its upper end, the pivoting device 25 bears a driver 29 which has a clip ring 29' which wraps around the pivoting sleeve 25' and, by means of a lug, reaches into a groove of the pivoting sleeve 25' and has a driver bolt 29" protruding radially from the clip ring 29'.

An essentially cylindrical guide tube 31, which is provided with two longitudinal channels 31', is arranged horizontally in the transverse direction of the head restraint 1 (y direction). Its left inside is closed. A setting disc 33, a compression spring, which is referred to in the following as a pivoting compression spring 35, and a sliding block 37 are introduced into the guide tube 31 from the open, right end side. The sliding block 37 is arranged with a cylindrical section within the guide tube 31 and is guided in the longitudinal direction of the guide tube 31 by means of a tongue-and-groove guide, and projects, with a radially protruding, relatively small, cuboidal section, forward from a corresponding cutout of the guide tube 31, which cutout is provided over approximately the right half of the guide tube 31. The position of the setting disc 33 within the guide tube 31 can be set, for example, by means of an adjusting screw which is screwed into a threaded hole on the end side of the guide tube 31. The guide tube 31 pre-assembled in such a manner is pushed by its longitudinal channel 31' into a base plate 41, which is slit laterally, and is fixed by means of two clips 43. The base plate 41 may also be designed as a single piece with the guide tube 31.

On the forwardly pointing side of the essentially flat base plate 41, a left rack 45 and a right rack 46 are guided moveably in the transverse direction of the head restraint 1 (y direction). The left rack 45 and the right rack 46 are mounted on a left rack guide 47 and a right rack guide 48, respectively, which are connected to the base plate 41. A rack cover 49, which is arranged in front of the two racks 45 and 46 and is fastened to the base plate 41, keeps the two racks 45 and 46, which are arranged slightly offset vertically, bearing against the base plate 41. The rack guides 47 and 48 and the rack cover 49 may each be formed of a single piece with a base plate 41. A sliding-block adapter 51, which is connected to the cuboidal section of the sliding block 37, is welded to the right end of the left rack 45, which end is arranged on the inside, or is formed as a single piece therewith. A left driver adapter 53 is welded to the left end of the left rack 45, which end is arranged on the outside, or is formed as a single piece therewith, the driver bolt 29" of the left pivoting device 25 reaching into the opening 53' of the said driver adapter, forming a type of articulated connection. A right driver adapter 54 is welded to the right end of the right rack 46, which end is arranged on the outside, or is formed as a single piece therewith, and the driver bolt 29" of the right pivoting device 25 reaches into the opening 54' of the said driver adapter, forming a type of articulated connection.

A bearing bushing 57 is inserted into a hole in the base plate 41 and a shaft 61 of a pinion 63 is mounted rotatably in the said bearing bushing. The pinion 63 is arranged between the two racks 45 and 46 in such a manner that the left rack 45 engages with its upwardly pointing toothing into the lower side of the pinion 63, and the right rack 46 engages with its downwardly pointing toothing into the upper side of the pinion 63. A ratchet wheel 65 is pushed onto the free end of the shaft 61, which end points to the rear and is arranged on the rear side of the base plate 41, and is fixed in place by means of a pin. The ratchet wheel 65 has a saw-tooth-like toothing which is directed such that it rotates to the right with regard to the x direction and in which a blocking hook 67 engages from above. The blocking hook 67, which is of lever-like design, is mounted pivotably in a bearing block 69 which is fitted on the rear side of the base plate 41 above an elbow on the left end of the guide tube 31. At that end of the blocking hook 67 which faces away from the ratchet wheel 65, a blocking-hook spring 71 is arranged around a pin of the blocking hook 67 and is clamped between the guide tube 31 of the blocking hook 67 and, as a result, prestresses the blocking hook 67 and the ratchet wheel 65 in the closing direction.

A cuboidal latch guide 73, which is designed in two parts, is fitted on the base plate 41 above the guide tube 31 and within it a latch 75 is guided moveably in the z direction. The latch 75 protrudes into the guide tube 31 through an opening 31" therein and thereby holds the sliding block 37. At its upper end, the latch 75 has a transverse pin 77, which is arranged in the y direction, and a respective ball bearing 79 on the left and right of the said transverse pin. A mass sensor 81 is fitted on a stirrup-shaped mass carrier 83 which is mounted pivotably with its two free limbs on the latch guide 73 via lateral bearing journals 85. A curved slotted latch guide 87, which rests on the ball bearings 79 of the latch 75, is fitted centrally on the lower side of the central section of the mass carrier 83, which section runs along the mass sensor 81. By means of a latch spring 89 between the latch guide 73 and the latch 75, the latter is biased upward (z direction) where it is held by the slotted latch guide 87. Stops 91 on the latch guide 73 delimit a pivoting movement (described later) of the mass carrier 83 together with the mass sensor 81 during the transfer into a released state. Two restoring springs 93, which are provided between a front fitting 95 on the base plate 41 and a rear fitting 97 on the mass carrier 83, ensure that the mass sensor 81 is restored into the initial state after any pivoting movement.

An impact plate 101, which points forwards (x direction) and is arranged in a y/z plane, is fitted moveably to the pivoting devices 25. For this purpose, the angled ends of the pivoting arms 27 are fitted into slotted guides or other sliding guides on the rear side of the impact plate 101. A padded and covered, front padding element 103 is fitted on the front side of the impact plate 101 while a likewise padded and covered, rear padding element 105 is fitted on the rear side of the base plate 41. The support frame (not illustrated in detail) of the padding element 105 may be designed as a single piece with the base plate 41, if appropriate also as a single piece with the guide tube 31. In the initial state, the front padding element 103 and the rear padding element 105 bear against each other, in which case they surround the components described above, and thus permit correct use of the head restraint 1. In the event of a rear-end crash, a first subassembly of the head restraint 1, comprising the impact plate 101 and front padding element 103, are to move relative to the rear components of the head restraint 1 and are to be guided towards the occupants head.

In the event of a rear-end crash, those components of the vehicle which are not connected rigidly to the vehicle structure are accelerated in a delayed manner, the delay depending, in particular, on the type and number of connecting stages up to the vehicle structure. Starting from the initial state, in the present case the mass sensor 81 moves to the rear relative to the remaining components of the head restraint 1 and in the process executes a pivoting movement about the bearing bolt 85 until the mass carrier 83 comes to bear against the stops 91. The slotted latch guide 87, which pivots at the same time, opens up to the latch 75 the path upwards in the z direction, as a result of which the latch spring 89 can pull the latch 75 out of the guide tube 31. The pivoting compression spring 35, which is used as an energy store for the pivoting movement, pushes the sliding block 37, which is now released, to the right, as a result of which the latter likewise pulls the left rack 45, as the drive-side element of a train of mechanisms, to the right. Via the pinion 63, which is in toothed engagement with the left rack 45 and now rotates, the right rack 46, which is in toothed engagement with the pinion 63, is pulled to the right, i.e. in opposed manner to the left rack 45. Owing to the direction of the teeth, the ratchet wheel 65, which is connected in a rotationally fixed manner to the pinion 63, rotates under the blocking hook 67. The two racks 45 and 46 move the drivers 29 of the pivoting devices 25 inwards via their driver adapters 53 and 54, with the result that the pivoting arms 27, which serve as output-side elements of the train of mechanisms, pivot apart in opposite directions from the folded initial state.

By means of the movement of the pivoting arms 27 pivoting open, firstly the impact plate 101, which is attached in an articulated manner thereto, is moved forward (x direction). Secondly, the locking sockets 28 leave the locking hooks 23. As a result, the vertical compression springs 13, which are used as an energy store for the vertical displacement, are relaxed and move the pivoting devices 25 together with the base plate 41 and components, which are fitted thereon and together form a second subassembly, upwards (z direction) relative to the vertical-locking means 15, which forms a third subassembly together with the head restraint rods 5. The impact plate 101 therefore executes a combined movement of two translatory movements in the x and z directions in order to come to bear against the occupants head as close as possible to the back of the head and as far away as possible from the neck. Pivoting stops 25", which are formed on the pivoting sleeves 25' of the pivoting devices 25, delimit the movement of the pivoting devices 25 in such a manner that in this released state the pivoting arms 27 point forward. The blocking hook 67 prevents further rotation of the ratchet wheel 65 and a movement of the racks 45 and 46. By means of this securing of the released state on the output side, the pivoting devices 25 are prevented from pivoting back into the initial state counter to the force of the pivoting compression spring 35, i.e. a reversible absorption of the kenetic energy of the occupant's head, and therefore also a subsequent transmission back to the occupant's head, is eliminated.

In the second exemplary embodiment, a head restraint 201 for a vehicle seat 202 is attached on two head restraint rods 205 which are introduced into the back rest 203. The following directional details refer to the arrangement of the vehicle seat 202 in a motor vehicle and to its customary direction of travel (x direction). In order to be set vertically, the head restraint 201 is designed in a manner known per se such that it can be displaced vertically (z direction) relative to the back rest 203 and can be snapped into place by suitable snap-in means. In the following, first of all the initial state of operative state of the head restraint 201 is described.

A stop 207, which is pushed by a sleeve region 207' onto the head restraint rod 205 and is connected to the latter, is provided at the upper end of each head restraint rod 205. The stop 207 is furthermore connected to an arm region 207", which protrudes vertically from the sleeve region 207' and points toward the other head restraint rod 205, forming a transverse strut, to the stop 207 on the other head restraint rod 205.

The vertical-locking means 215 of the head restraint 201 comprises an elongate yoke 217 which is arranged in the transverse direction of the vehicle seat (y direction) and has passages 217' for the head restraint rods 205 and two unlocking buttons 219 which are inserted in the y direction into corresponding slots of the yoke 217 and in each case have a passage 219' for the associated head restraint rod 205. The spring-loaded unlocking buttons 219 interact, via the boundaries of their passages 219', with corresponding notches 205' in the head restraint rods 205, in order to lock the latter. In normal use, in order to set the height of the head restraint 201, the vertical-locking means 215 is released from the notches 205' by pressing the unlocking buttons 219, the entire head restraint 201 is moved to the desired height and a new snap-in position of the vertical-locking means 215 is taken up.

In the z direction, the yoke 217 accommodates a compression ring 220, with a washer 222 arranged above it, in the region of each passage 217'. Situated radially further outwards, in each case two radially inwardly curved locking hooks 223 are formed on the yoke 217, in the region of each passage 217'. A pivoting device 225 is pushed with its tubular pivoting sleeve 225' onto each head restraint rod 205, with the interposition in each case of a sleeve-type freewheel 224 having a sleeve 224'. A rear hinge 227 protrudes from the pivoting sleeve 225'. At the lower end of its pivoting sleeve 225', each pivoting device 225 has a flange-like, first foot region 228 and a narrow, second foot region 230 lying radially opposite, the foot regions both pointing radially outward and, in the initial state of the head restraint 201, are pivoted under the locking hooks 223, so that the pivoting device 225 is locked. In this initial state, the rear hinges 227 point obliquely inwards.

A front hinge 232 is articulated in a manner known per se on each rear hinge 227, i.e. the two hinges 227 and 232 have vertically alternating sleeve-shaped sockets, for a hinge pin 234. The hinge pins 234 are arranged parallel to the head restraint rods 205. An essentially plate-like impact element 236 is articulated in the same manner, by means of further hinge pins 234, on the front hinges 232, which point obliquely outward. A double leg spring 238 has two helically coiled regions which are arranged in the y direction with a central region in between that extends out in a stirrup-shaped manner, and two end regions bent in a hook-shaped manner. A securing means 242 is used to fasten the double leg spring 238 in its central region to the impact element 236 while it is hooked rotatably with its end regions under prestress into two front bearing blocks 244 of the yoke 217. Opposite the impact element 236, a rear padding support 246 of similar size is fitted to the yoke 217.

In the initial state, the impact element 236 is held back counter to the prestressed double leg spring 238 by means of an impact-element locking means 250. The impact-element locking means 250 has a blocking hook 252 which is mounted pivotably in a rear bearing block 254 of the yoke 217. In the initial state, the blocking hook 252 is hooked from below into the securing means 242 of the impact element 236. At this end, a two-part toggle lever 256 is articulated on the blocking hook 252 and is articulated by its other end on the yoke 217. In the initial state, the toggle lever 256 is pushed upwards and thereby holds the blocking hook 252. A tension spring 258 hanging downwards is fitted to the buckling point of the toggle lever 256.

Below the toggle lever 256, a shaft 260 which has a plurality of radially protruding arms is mounted in the yoke 217. The other end of the tension spring 258 is fitted to a central, forwardly pointing first arm 260'. A heavy release mass 262 is fitted as the mass sensor to a downwardly pointing second arm 260", which is arranged slightly offset with respect to the first arm. A forwardly pointing third arm, which is arranged offset with respect to the second arm and is referred to below as the catch 260''', is arranged above a blocking mass 264 or rests on it. The blocking mass 264 is likewise mounted pivotably in the yoke 217 and a biased against the shaft 260 by a leg spring 266. The blocking mass 264 prevents release, for example in the event of impacts against the head restraint 201, by it moving, in the case of such momentum, more rapidly than the release mass 262 and then blocking the latter by bearing against the catch 260'''.

A padded and covered, front padding element 270 is attached on the front side of the impact element 236 while a likewise padded and covered, rear padding element 272 is attached on the rear side of the rear padding support 246. In the initial state, the front padding element 270 and the rear padding element 272 bear against each other, in which case they enclose the components described above in the manner of a closed unit, and thereby make possible correct use of the head restraint 201. In the event of a rear-end crash, a first subassembly of the head restraint 201, comprising the impact element 236 and front padded element 270, is intended to move relative to the rear components of the head restraint 201 and to be guided towards the occupant's head.

In the case of a rear-end crash of this type, those components of the vehicle which are not connected rigidly to the vehicle structure are accelerated in a delayed manner, the delay depending in particular on the type and number of connecting stages up to the vehicle structure. Starting from the initial state, the release mass 262 moves to the rear relative to the remaining components of the head restraint 201 and executes a pivoting movement together with the shaft 260. The blocking mass 264 is configured together with its leg spring 266 in such a manner that it pivots more slowly to the rear and remains ineffective in this case. The pivoting shaft 260 pulls on the toggle lever 256 via the tension spring 258. When a certain spring force is reached, the toggle lever 256 drops downward and releases the blocking hook 252. The impact-element locking means 250, which is effective in the x direction, is unlocked as a result. The double leg spring 238 moves the impact element 236 forwards in the x direction.

The movement of the impact element 236 causes the hinged guide, which comprises front and rear hinges 232 and 227, to swing open. By rotation of the rear hinges 227, the foot regions 228 and 230 of the pivoting device 225 come free from the locking hooks 223. The opening of this locking means, which is effective in the z direction, enables the compression springs 220 to relax, i.e. the pivoting devices 225 forming a second subassembly are moved relative to the vertical-locking means 215, which forms a third subassembly together with the head restraint rods 205, upwards in the z direction into the uppermost position. The sleeve-type freewheels 224, which are moved transversely to their direction of action, do not prevent this movement. End stops are provided on the yoke 217 and on the rear padding support 245 for the pivoting movement of the pivoting devices 225 and the swinging-out movement of the hinged guide. The hinges 227 and 232 may also have mutual stops for their movement. The impact element 236 therefore executes a combined movement of two translatory movements in the x and z directions in order to come to bear against the occupant's head as close as possible to the back of the head and as far away as possible from the neck.

If, during or after the movement of the impact element 236, the occupant's head comes to bear against the front padded element 270, then the two sleeve-type freewheels 224 clamp the pivoting devices 225 on the head restraint rods 205. The sleeve-type freewheels 224 are effective in an infinitely variable manner in each intermediate position. In order to reset the sleeve-type freewheels 224, the head restraint 201 has to be brought into its lowermost position. The head restraint rods 205 are reduced there in their diameter by means of recesses 205", so that the sleeve-type freewheels 224 do not deploy their blocking action there. A reversible absorption of the kinetic energy of the occupant's head by means of the double leg spring 238, and therefore also a subsequent transmission of it back to the occupant's head are eliminated as a result.

That which is claimed:

1. A head restraint for a vehicle seat, wherein the head restraint is for restraining a head of an occupant of the vehicle seat in the event of a crash, the head restraint comprising:

a first subassembly positioned for resting against a rear of the head of the occupant;

a second subassembly mounted for being vertically adjustable, wherein the first subassembly is mounted for moving forwardly relative to the second subassembly;

a first driving mechanism mounted for forwardly moving the first subassembly relative to the second subassembly in the event of a crash;

a third subassembly positioned below the second subassembly, wherein at least the first subassembly is mounted for moving upwardly relative to the third subassembly; and a second driving mechanism mounted for upwardly moving at least the first subassembly relative to the third subassembly in the event of a crash.

2. A head restraint according to claim 1, wherein:

the second driving mechanism is mounted for upwardly moving the second subassembly relative to the third subassembly in the event of a crash; and the first subassembly is mounted to the second subassembly so that the second subassembly carries the first subassembly upward relative to the third subassembly in the event of a crash, whereby the second driving mechanism is for moving the first and second subassemblies upward relative to the third subassembly in the event of a crash.

3. A head restraint according to claim 2, wherein:

the first driving mechanism is operative for causing translatory forward movement of the first subassembly relative to the second subassembly in the event of a crash; and the second driving mechanism is operative for causing translatory upward movement of the second subassembly relative to the third subassembly in the event of a crash.

4. A head restraint according to claim 3, wherein at least the first subassembly, the second subassembly, and the third subassembly are cooperative for forming a closed unit during an initial state that is prior to a crash.

5. A head restraint according to claim 4, wherein:

the second subassembly includes at least one energy storage device of the first driving mechanism, with the energy storage device of the first driving mechanism being mounted for providing force for forwardly moving the first subassembly relative to the second subassembly in the event of a crash;

a biased first locking device is mounted for securing the energy storage device of the first driving mechanism during the initial state, so as to at least initially prevent the energy storage device of the first driving mechanism from providing force for forwardly moving the first subassembly relative to the second subassembly;

a mass sensor is arranged within the head restraint for causing the first locking device to release the energy storage device of the first driving mechanism in the event of a crash, so as to allow the energy storage device of the first driving mechanism to provide force for forwardly moving the first subassembly relative to the second subassembly;

the first driving mechanism further includes a train of mechanisms cooperating with the energy storage device of the first driving mechanism for forwardly moving the first subassembly relative to the second subassembly in response to the release of the energy storage device of the first driving mechanism, wherein the train of mechanisms has at least one pivotable arm which is operatively connected to the first subassembly, and the pivotable arm brings about the movement of the first subassembly at least partially by way of pivoting movement of the pivotable arm;

a catch is mounted for securing the first subassembly after a crash, wherein the first driving mechanism is for moving the first subassembly from a first position to a second position in the event of a crash, with the first subassembly being closer to the second subassembly in the first position than in the second position, and the catch is operative for securing the first subassembly in the second position after a crash;

the second subassembly further includes at least one energy storage device of the second driving mechanism, with the energy storage device of the second driving mechanism being mounted for providing force for moving the first and second subassemblies upward relative to the third subassembly in the event of a crash;

a second locking device is mounted for securing the energy storage device of the second driving mechanism during the initial state, so as to at least initially prevent the energy storage device of the second driving mechanism from providing force for moving the first and second subassemblies upward relative to the third subassembly; and the train of mechanisms causes the second locking device to release the energy storage device of the second driving mechanism in the event of a crash, so as to allow the second driving mechanism to move the first and second subassemblies upward relative to the third subassembly.

6. A head restraint according to claim 3, wherein:
the second subassembly includes at least one energy storage device of the first driving mechanism, with the energy storage device of the first driving mechanism being mounted for providing force for forwardly moving the first subassembly relative to the second subassembly in the event of a crash;
a biased first locking device is mounted for securing the energy storage device of the first driving mechanism during an initial state that is prior to a crash, so as to at least initially prevent the energy storage device of the first driving mechanism from providing force for forwardly moving the first subassembly relative to the second subassembly;
a mass sensor is arranged within the head restraint for causing the first locking device to release the energy storage device of the first driving mechanism in the event of a crash, so as to allow the energy storage device of the first driving mechanism to provide force for forwardly moving the first subassembly relative to the second subassembly;
the first driving mechanism further includes a train of mechanisms cooperating with the energy storage device of the first driving mechanism for forwardly moving the first subassembly relative to the second subassembly in response to the release of the energy storage device of the first driving mechanism, wherein the train of mechanisms has at least one pivotable arm which is operatively connected to the first subassembly, and the pivotable arm brings about the movement of the first subassembly at least partially by way of pivoting movement of the pivotable arm;
a catch is mounted for securing the first subassembly after a crash, wherein the first driving mechanism is for moving the first subassembly from a first position to a second position in the event of a crash, with the first subassembly being closer to the second subassembly in the first position than in the second position, and the catch is operative for securing the first subassembly in the second position after a crash;
the second subassembly further includes at least one energy storage device of the second driving mechanism, with the energy storage device of the second driving mechanism being mounted for providing force for moving the first and second subassemblies upward relative to the third subassembly in the event of a crash;
a second locking device is mounted for securing the energy storage device of the second driving mechanism during the initial state, so as to at least initially prevent the energy storage device of the second driving mechanism from providing force for moving the first and second subassemblies upward relative to the third subassembly; and
the train of mechanisms causes the second locking device to release the energy storage device of the second driving mechanism in the event of a crash, so as to allow the second driving mechanism to move the first and second subassemblies upward relative to the third subassembly.

7. A head restraint according to claim 6, wherein:
the train of mechanisms of the first driving mechanism includes at least one pivoting device mounted for pivoting relative to a fixed component while the first driving mechanism forwardly moves the first subassembly relative to the second subassembly in the event of a crash, and
a freewheel is between a pivoting device and the fixed component, wherein the freewheel is operative for both:
allowing forward movement of the first subassembly relative to the second subassembly, and
restricting rearward movement of the first subassembly relative to the second subassembly.

8. A head restraint according to claim 7, wherein the train of mechanisms of the first driving mechanism includes a hinged guide positioned between the first and second subassemblies for at least partially delimiting forward movement of the first subassembly relative to the second subassembly in the event of a crash, and the pivoting device is part of the hinged guide.

9. A head restraint according to claim 7, wherein the fixed component is a head restraint rod, whereby the freewheel is effective between the pivoting device and the head restraint rod, and wherein the head restraint rod has at least one point with a reduced diameter for releasing the freewheel.

10. A head restraint according to claim 1, wherein:
the first driving mechanism includes at least one pivoting device mounted for pivoting relative to a fixed component while the first driving mechanism forwardly moves the first subassembly relative the second subassembly in the event of a crash, and
a freewheel is between the pivoting device and the fixed component, wherein the freewheel is operative for both:
allowing forward movement of the first subassembly relative to the second subassembly, and
restricting rearward movement of the first subassembly relative to the second subassembly.

11. A head restraint according to claim 10, wherein the first driving mechanism includes:
an energy storage device positioned between the first and second subassemblies for providing force for forwardly moving the first subassembly relative to the second subassembly in the event of a crash; and
a hinged guide positioned between the first and second subassemblies for at least partially delimiting forward movement of the first subassembly relative to the second subassembly in the event of a crash.

12. A head restraint according to claim 11, wherein the pivoting device forms part of the hinged guide.

13. A head restraint according to claim 12, wherein:
a biased locking device is mounted for securing the energy storage device, with the locking device securing the energy storage device during an initial state which is prior to a crash, so as to at least initially prevent the energy storage device from forwardly moving the first subassembly relative to the second subassembly, and
a mass sensor is arranged within the head restraint for causing the locking device to release the energy storage device in the event of a crash, so as to allow the energy storage device to forwardly move the first subassembly relative to the second subassembly.

14. A head restraint according to claim 11, wherein:
a biased locking device is mounted for securing the energy storage device, with the locking device securing the energy storage device during an initial state which is prior to a crash, so as to at least initially prevent the energy storage device from forwardly moving the first subassembly relative to the second subassembly, and
a mass sensor is arranged within the head restraint for causing the locking device to release the energy storage device in the event of a crash, so as to allow the energy storage device to forwardly move the first subassembly relative to the second subassembly.

15. A head restraint according to claim 14, wherein a blocking mass is arranged within the head restraint and is operative for preventing the mass sensor from causing the locking device to release the energy storage device in the event of predetermined forces being imparted on the head restraint prior to a crash.

16. A head restraint according to claim 10, wherein:

the second subassembly includes at least one dedicated energy storage device of the second driving mechanism, the energy storage device is for providing force for upwardly moving the first subassembly relative to the third subassembly in the event of a crash, and a locking device is mounted for securing the energy storage device, with the locking device securing the energy storage device during an initial state which is prior to a crash, so as to at least initially prevent the energy storage device from upwardly moving the first subassembly relative to the third subassembly, and the pivoting movement of the pivoting device, which occurs in the event of a crash, causes the locking device to release the energy storage device, so as to allow the energy storage device to upwardly move the first subassembly relative to the third subassembly.

17. A head restraint according to claim 10, wherein the fixed component is a head restraint rod, whereby the freewheel is effective between the pivoting device and the head restraint rod, and wherein the head restraint rod has at least one point with a reduced diameter for releasing the freewheel.

18. A head restraint according to claim 1, wherein the head restraint is in combination with the vehicle seat by virtue of the head restraint being mounted to the vehicle seat.

* * * * *